United States Patent
Hwang

[11] Patent Number: 5,959,696
[45] Date of Patent: Sep. 28, 1999

[54] DYNAMIC RANGE EXPANDING APPARATUS OF A VIDEO IMAGE

[75] Inventor: Jung-Hyun Hwang, Seoul, Rep. of Korea

[73] Assignee: Samsung Electronics, Co., Ltd., Suwon, Rep. of Korea

[21] Appl. No.: 08/948,710

[22] Filed: Oct. 10, 1997

[30] Foreign Application Priority Data

Oct. 10, 1996 [KR] Rep. of Korea .................. 96-45122

[51] Int. Cl.$^6$ ................... H04N 5/52; H04N 5/57
[52] U.S. Cl. ............ 348/678; 348/672; 348/679; 348/687; 348/222
[58] Field of Search ..................... 348/659, 660, 348/661, 671, 672, 678, 679, 680, 687, 712, 713, 222, 234, 257; H04N 5/57, 5/52

[56] References Cited

U.S. PATENT DOCUMENTS 5,144,442  9/1992  Ginosar .
5,496,106  3/1996  Anderson .

*Primary Examiner*—Sherrie Hsia
*Attorney, Agent, or Firm*—Marger Johnson & McCollom, P.C.

[57] ABSTRACT

The present invention relates to a dynamic range expanding apparatus. The dynamic range expanding apparatus realizes a wide dynamic range for a video image while reducing the quantization noise, by determining the brightness transform function based on the combined results of the differential and the integral operation with respect to a brightness distribution function. Moreover, the dynamic range expanding apparatus transforms the color difference signal by using the brightness transform ratio without losing the valance in a color tone.

12 Claims, 4 Drawing Sheets

DYNAMIC RANGE EXPANDING APPARATUS OF A VIDEO IMAGE

BACKGROUND OF THE INVENTION

1. Field of the Invention

The present invention relates to a dynamic range expanding apparatus of a video image, and more particularly to an expanding apparatus employing a histogram equalization with respect to a brightness distribution of a video image.

2. Description of the Related Art

A video image (e.g. a photograph) taken by an imaging system, such as a camera, contains a variety of different information about an object. In such an image, it frequently occurs that the brightness and the color information in the image is distorted or not distributed uniformly due to the quantity of light exposed into the object, the performance of the imaging system or the picture-taking conditions. In this case, a preprocessing step, such as a histogram equalization, improves the contrast of the image and thus makes it easy to analyze the image and to extract the characteristics from the video image in the later steps. In general, a device which performs such a preprocessing step to increase the contrast of the video image is called a "dynamic range expanding apparatus."

One such representative prior dynamic range expanding apparatus implementing AGC (automatic gain control) is disclosed in U.S. Pat. No. 4,719,350, "Radiation imaging enhancement". According to this dynamic range expanding apparatus, a low frequency or DC component is filtered from a video signal, and thus the dynamic range is reduced. Then, signal processing is performed where the bits per pixel are restricted.

This type of signal processing has the drawback in that minute contrast information is lost as the dynamic range is reduced. This system has a further disadvantage in that spatial adaptive processing is impossible since signal processing is performed in a unit of a frame.

Next, a dynamic range expanding apparatus using a homomorphic filter will be described in connection with FIG. 1.

FIG. 1 is a block diagram showing the homomorphic filter which forms the prior dynamic range expanding apparatus.

As shown in FIG. 1, the homomorphic filter is comprised of log transforming block 11, high pass filter 12 and exponent transforming block 13. The dynamic range expanding apparatus with such a homomorphic filter can be classified as an image enhancement using a transform operation. The details of the image enhancement is disclosed in Stockham, "Image Processing in the Context of a Visual Model", Proceedings of the IEEE, 60(7), Jul. 1972, pages 838–842, and Xie et al, "Towards the Unification of Three Visual Laws and Two Visual Models in Brightness Perception", IEEE Trans systems, Man Cybernetics, 19(2), March/April 1989, pages 379–382.

Referring to FIG. 1, the video image signal is transformed to a logarithm by a log transforming block 11, and thus the illumination and the reflectance components are extracted from the video image signal. The reflectance component is filtered by the high pass filter 12. The output of the high pass filter 12 is transformed to an exponent, which is the same as the inverse log, by the exponent transforming block 13. Moreover, the reflectance component is selectively amplified by the high pass filter 12.

A camera system based on the above dynamic range expanding apparatus is disclosed in U.S. Pat. No. 5,144,442 under the name of "Wide dynamic range camera". An input part of the camera system is illustrated in FIG. 2.

The input part, as is illustrated in FIG. 2, is comprised of a plurality of cameras 31, 32 and 33, a pixel selector 34 and an NTP (Neighborhood Transform Processing) block 35.

A plurality of video image signals are obtained from cameras 31,32 and 33, and each signal is selected respectively by the pixel selector 34. The output of the pixel selector 34 is provided with an internal module of the camera system, and inputted to the NTP block 35 simultaneously. In the NTP block 35, a neighborhood transform processing is performed with respect to each video image signal, and the signal obtained in such a way is provided with the internal module of the camera system along with the output of the pixel selector 34. The prior dynamic range expanding apparatus requires a field memory or other complicated circuitry since it must process the input with respect to a plurality of video image signals.

To improve the contrast of the video image more effectively, a histogram equalization technique performed on the brightness distribution of a video image is widely known. Such a technique is disclosed in Anil K. Jane, "Fundamental of Digital Image Processing", Prentice-Hall International Edition, pages 241–243.

The histogram equalization technique is a type of a image enhancement. When the brightness of the video image is concentrated on some region of an effective display area, the histogram equalization technique increases the contrast of the brightness range on that region, thereby causing the dynamic range to be expanded. However, the histogram equalization technique has a disadvantage that, when the contrast of the dense brightness range greatly increases, the contrast of the sparse brightness range decreases and a digital noise or quantization noise is likewise amplified.

To improve the above mentioned disadvantage, a modified histogram equalization technique has been proposed. However, the modified histogram equalization technique is realized through complicated circuitry and can not improve the contrast and the noise simultaneously.

A plurality of methods for applying the improvement of dynamic range of brightness level to a color image have been proposed. Most of these methods expand or reduce the dynamic range of the RGB signal that is a color signal of a video image. More specifically, one of these methods improves the color components individually. Another method is to extract a brightness signal from the video image, and then to control the extracted brightness signal uniformly in accordance with the expanding reducing information as to the dynamic range of the brightness signal. One method for uniformly controlling the RGB signal obtained from multiple video image inputs in accordance with a brightness information is disclosed in U.S. Pat. No. 5,247,366, "Color wide dynamic range camera". However, the prior art has a disadvantage that the detailed circuit is very complex since an individual multi-stage control of the color signal as well as a processing of multiple video image inputs is required. Next, a prior histogram equalization will be described in detail in connection with FIGS. 3, 4A–4D, and 5A–5C.

According to the prior histogram equalization, the brightness distribution of a video image is smoothed. Namely, when expanding the dynamic range of brightness levels in a dense image, the prior histogram equalization improves the contrast of the overall image.

When the brightness level is i (i={0, 1, ..., L−1}, herein L is a brightness range) and brightness distribution function is h(i), a brightness transform function f(i), or "gray scale transform function," is defined as the following formula.

$$f(i) = (L-1) \cdot \sum_{j=0}^{i} p(j)$$

The function P(i) in the above formula is defined as follows:

$$P(i) = \frac{h(i)}{\sum_{j=0}^{L-1} h(j)}$$

When the brightness signal of an input video image is represented as y(x), herein x is a two dimensional vector notifying coordinates of a video image, and a transformed brightness signal y'(x), the two signals can be represented in the following formula:

$$y'(x) = f(y(x))$$

FIG. 3 is a block diagram showing the dynamic range expanding apparatus according to the prior histogram equalization.

As shown in FIG. 3, the dynamic range expanding apparatus includes a histogram generator 21, an integrator 22 and a memory 23.

The histogram generator 21 receives a brightness signal y of a video image, and determines a brightness distribution function h(i) with respect to the brightness signal (y). The brightness distribution function h(i) of the histogram generator 21 is output to the integrator 22. In the integrator 22, an integration of the brightness distribution function is performed, and the result of the integration is output to the memory 23 as a brightness transform function f(i). The memory 23 stores a plurality of LUTs (Look-Up Tables) as to a brightness transform function in advance. Thus, the memory 23 determines an LUT in accordance with the output of the integrator 22, and then outputs a transformed brightness signal y' C through the determined LUT in response to the brightness signal of an input video image y.

FIG. 4A is a graph showing a brightness distribution function h(i) as to a video image produced in very low light. FIG. 4B is a graph showing a brightness transform function f(i). In FIG. 4C, a distribution of a transformed brightness signal in FIG. 3 is illustrated, and in FIG. 4D, the result of low pass filtering of the distribution in FIG. 4C with respect to i is illustrated.

However, if the video image is modified by the above equalization method, the resulting contrast of the video image is lost in the range with low occurrence of the video image even though it might be improved over most of the range. Furthermore, when the video image is concentrated in a particular brightness level range, the quantization error or the digital noise is also increased by the brightness transform of the range.

To solve the above problem, a modified equalization method that improves the contrast appropriately has been proposed. According to the modified equalization method, the brightness transform function can be represented as the following formula.

$$f(i) = (L-1) \cdot \frac{\sum_{j=0}^{i} P^k(j)}{\sum_{j=0}^{L-1} P^k(j)}$$

Herein, the variable k regulates the sensitivity of the brightness transform function.

FIG. 5A is a graph showing the brightness transform function f(i) when the variable k is set between 0 and 1. FIG. 5B is a graph showing a distribution of the transformed brightness h'i signal obtained through the transform function in FIG. 5A. FIG. 5C is a graph showing the result of low pass filtering of the distribution in FIG. 5B with respect to i.

Consequently, control of the variable k can regulate the dynamic range of the video signal. When this is properly implemented, the quantization error can be lessened without sacrificing the overall dynamic range. However, this method produces a trade-off between the dynamic range of the video signal and the quantization error. For example, when the dynamic range increases, the quantization error increases; and when the quantization error decreases, the dynamic range decreases.

According to the prior histogram equalization, the brightness transform function is determined by the integral operation of the brightness distribution. In this case, when the occurrence of the video image is concentrated in a particular range of a brightness level, the slope of the brightness transform function increases in that region. Using prior histogram equalization, however, the more the dynamic range of the video image is expanded, the more the quantization noise also increases.

Accordingly, a need remains for a dynamic range expanding apparatus that is capable of expanding the dynamic range of the video image by the brightness transform while decreasing the quantization noise.

SUMMARY OF THE INVENTION

According to the invention, the quantization noise of the image is reduced by suppressing the slope of the brightness transform function in the range of a brightness level where the occurrence of the video image is concentrated.

More specifically, in this invention, the result of a differential operation multiplied by a predetermined gain and an integral operation, with respect to a brightness distribution function, are combined so as to determine a brightness transform function. Namely, the steep slope of the brightness transform function in the above mentioned range can be reduced by the result of the differential operation whereby the specific slope is controlled by the gain. Accordingly, the quantization noise which appears in the range where the slope of the brightness transform function is steep can be reduced.

The principle of this invention can be represented as the following formula:

$$f(i) = (L-1) \cdot \left[ \sum_{j=0}^{i} P(j) + \alpha \cdot d^2 \frac{P(i)}{di^2} \right]$$

The dynamic range apparatus according to the present invention, comprises a brightness distribution generating means for receiving a brightness signal of a video image and producing a brightness distribution function corresponding to the brightness signal; an integrator for performing an integral operation of the brightness distribution function; a differentiator for performing a differential operation of the brightness distribution function and producing the result of the differential operation multiplied by a predetermined gain; an adder for combining the output of the integrator and the output of the differentiator; and a memory, which stores a plurality of brightness transform functions as look-up tables, for determining one look-up table in accordance with the output of the adder and outputting a transformed brightness signal through the determined look-up table in response to the brightness signal.

As described above, the result of the differential operation and the result of the integral operation are combined by the adder, and the brightness transform function is determined by the output of the adder.

Accordingly, even though the occurrence of the video image is concentrated in a particular range of a brightness level, the quantization noise is reduced since the slope of the brightness transform function in that range influenced by the differential operation. Since the result of the integral operation still influences the determination of the brightness transform function, the expansion of the dynamic range of the video image is also attained.

The present invention will become more apparent from the following detailed description of the preferred embodiment taken in conjunction with the accompanying drawings.

DETAILED DESCRIPTION OF THE EMBODIMENTS

In the following, the present invention will be described with reference to the attached drawings.

The first embodiment will be considered with reference to FIGS. 6 and 7A to 7D.

Figure 1:
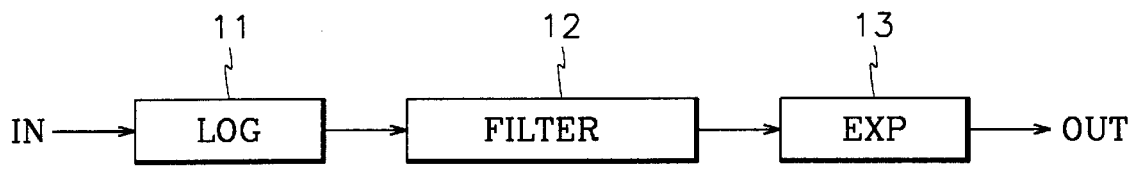
FIG. 1 is a block diagram showing the homomorphic filter which form the prior dynamic range expanding apparatus.
Figure 2:
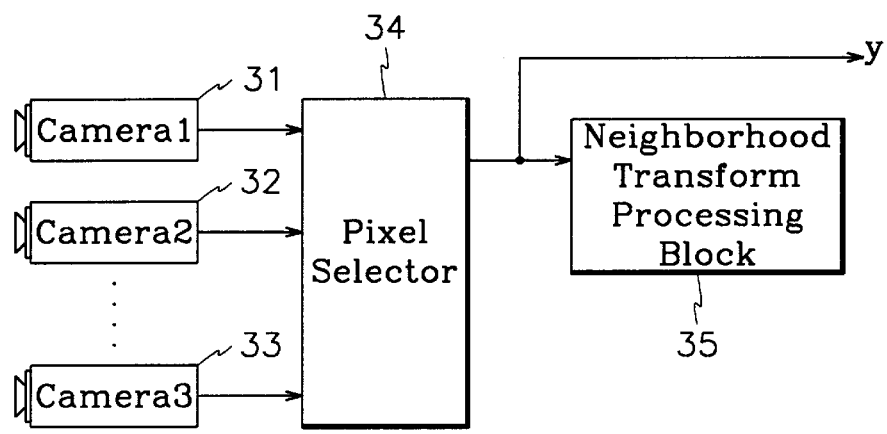
FIG. 2 is a block diagram showing the input part of a prior camera system having the dynamic range expanding apparatus in FIG. 1.
Figure 3:
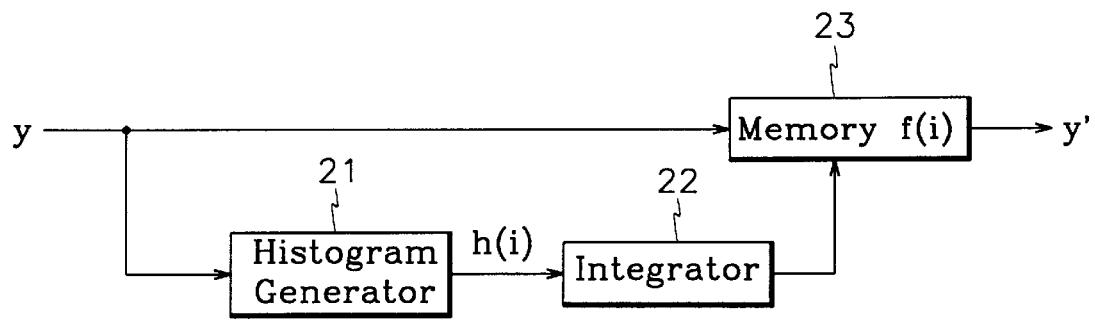
FIG. 3 is a block diagram showing the dynamic range expanding apparatus according to the prior histogram equalization.
Figure 4A:
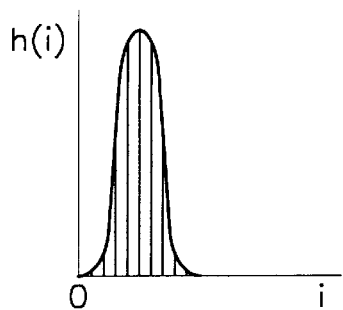
FIG. 4A is a graph showing a brightness distribution function h(i) in FIG. 3.
Figure 4B:
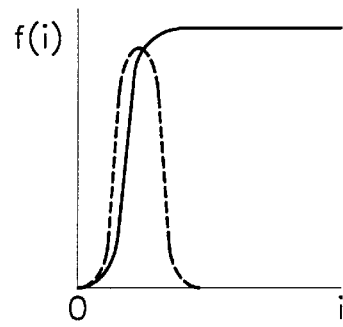
FIG. 4B is a graph showing a brightness transform function f(i) in FIG. 3.
Figure 4C:
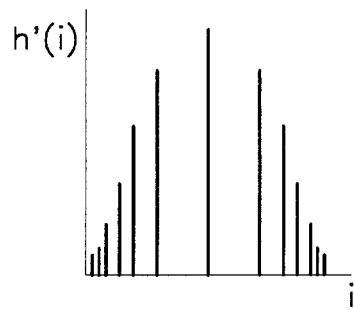
FIG. 4C is a graph showing a distribution of a transformed brightness signal in FIG. 3.
Figure 4D:
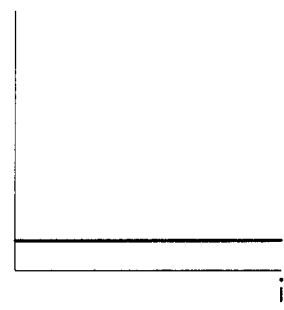
FIG. 4D is a graph showing the result of low pass filtering of the distribution in FIG. 4C with respect to i.
Figure 5A:
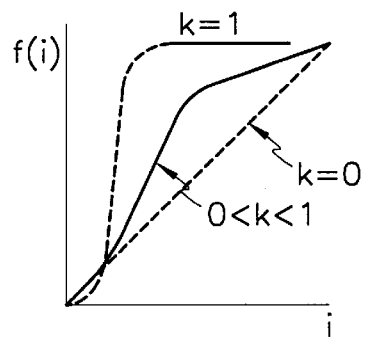
FIG. 5A is a graph showing a prior brightness transform function, herein the variable k being set between 0 and 1.
Figure 5B:
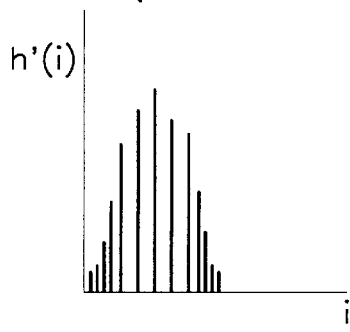
FIG. 5B is a graph showing a distribution of the transformed brightness signal obtained through the transform function in FIG. 5A.
Figure 5C:
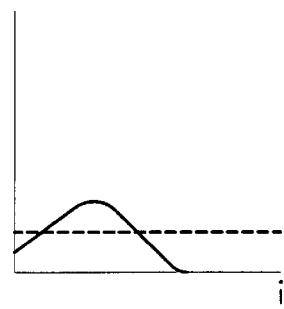
FIG. 5C is a graph showing the result of low pass filtering of the distribution in FIG. 5B with respect to i.
Figure 6:
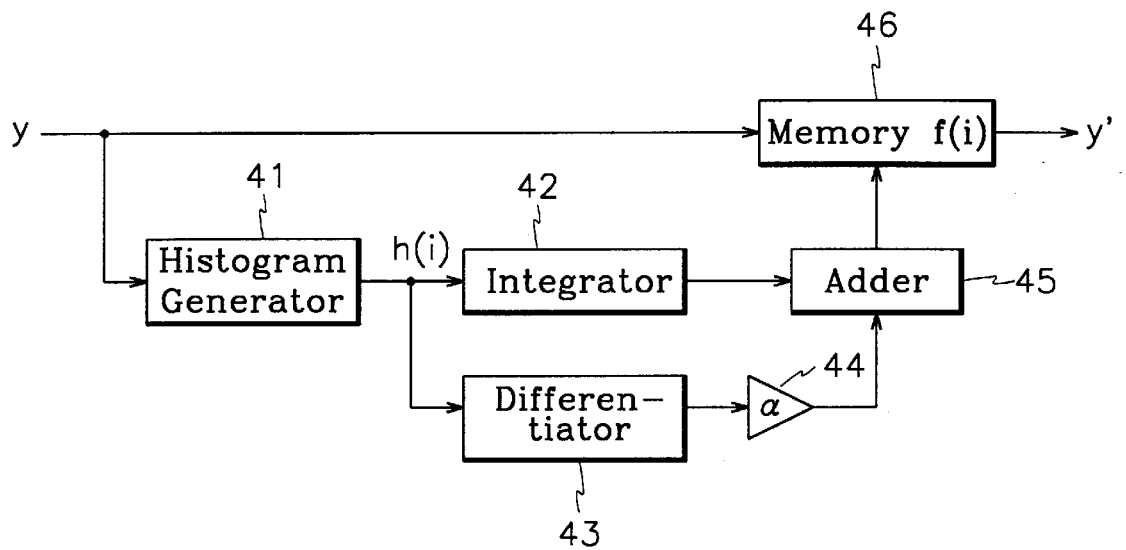
FIG. 6 is a block diagram showing the dynamic range expanding apparatus according to a first embodiment of the invention.

As shown in FIG. 6, the dynamic range expanding apparatus according to the first embodiment of this invention includes a histogram generator 41, an integrator 42, a differentiator 43, a gain controller 44, an adder 45 and a memory.

More specifically, a brightness signal y of a video image is input to the histogram generator 41 and the memory 46 at the same time. The output of the histogram generator 41 is input to the integrator 42 and the differentiator 43 in parallel. The output of the differentiator 43 is input to the gain controller 44, and each output of the integrator 42 and the gain controller 44 is input to the adder 45. The output of the adder 45 is input to the memory 46, and a transformed brightness signal y' is obtained from the memory 46.

Figure 7A:
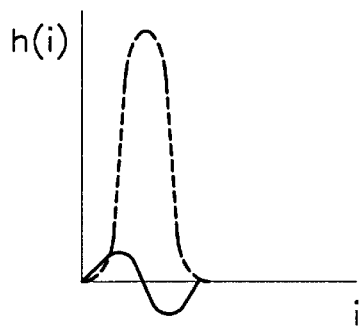
FIG. 7A is a graph showing the result of a differential operation of a brightness distribution function h(i) in FIG. 6.
Figure 7C:
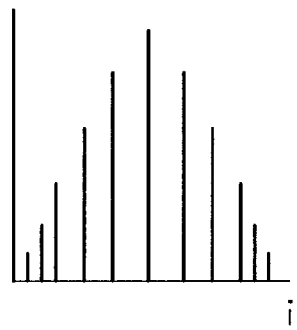
FIG. 7C is a graph showing a distribution of a transformed brightness signal obtained through the transform function in FIG. 7B.
Figure 7B:
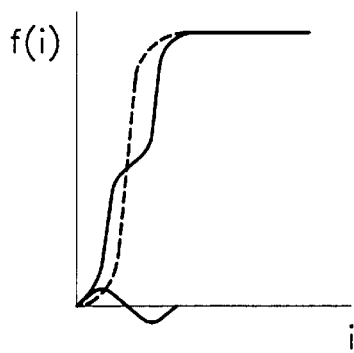
FIG. 7B is a graph showing a brightness transform function f(i) in FIG. 6.

The histogram generator 41 receives a brightness signal y of a video image and determines a brightness distribution function with respect to the brightness signal y. When a brightness distribution function h(i) corresponding to one field is determined, it is output to the integrator 42 and differentiator 43 in parallel. In FIG. 7A, the function indicated by a dotted line is the brightness distribution function h(i). The integrator 42 performs an integral operation of the brightness distribution function h(i) with respect to a brightness level i, and the result of the integral operation is illustrated in the FIG. 7B graph as a dotted line. The differentiator 43 performs a differential operation of the brightness distribution function h(i) with respect to the brightness level i, and the result of the differential operation is illustrated in the FIGS. 7A and 7B graphs as a solid line. In FIG. 7B, the lower of the two solid lines is the result of the differential operation. The gain controller 44 multiplies the result of the differential operation from the differentiator 43 by a gain α. Adjustment of the gain α enables the amplitude of the differential graph to be controlled. It is preferable to set the gain a in the range of between about 0.7 to 1.5. Each output of the integrator 42 and the gain controller 44 is output to the adder 45. The adder 45 combines the two outputs of the integrator 42 and the gain controller 44, and the result of the combination is illustrated in the FIG. 7B graph as the upper of the two solid lines. The output of the adder 45 is output to the memory 46 as a brightness transform function f(i). As shown by the graph of the brightness transform function f(i), it is apparent that the graph has a more shallow slope in the region of the brightness level i where the brightness distribution is large.

Figure 7D:
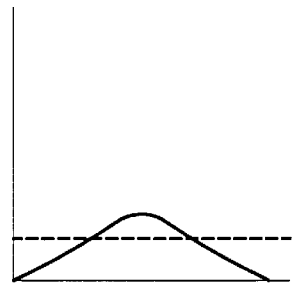
FIG. 7D is a graph showing the result of low pass filtering of the distribution in FIG. 7C with respect to i.

The memory 46 stores a plurality of LUTs, and determines an LUT in accordance with the output of the adder 45. Then, the memory 46 outputs a transformed brightness signal y' through the determined LUT in response to the brightness signal y. In this case, the brightness transform function f(i) outputted from the adder 45 is updated in every field or frame. To store the updated brightness transform function f(i), the memory 46 is realized by a line memory in which the number of addresses is L. In FIG. 7C, the graph of a distribution of the transformed brightness signal y' is illustrated. Referring to FIG. 7C, it is apparent that the overall dynamic range is expanded but the quantization noise is suppressed. In FIG. 7D, the result of low pass filtering of the graph in FIG. 7C is illustrated.

Especially, since the probability distribution of a conventional video image is of a Gaussian type, the graph in FIG. 7C fits well in with the human visual characteristics.

Although the first embodiment of this invention includes a differentiator connected to the histogram generator 41, other variations can be considered to obtain the result of the differential operation as to the brightness distribution function. For example, when a second-order differentiator is used for differentiating the output of the integrator 42, the result of the differential operation as to the brightness distribution function also can be obtained.

Furthermore, to save the capacity of the memory 46, it is possible to design the memory 46 so that the memory 46 may store the brightness transform function with respect to every few brightness levels. In this case, the brightness transform function with respect to the other brightness levels is determined through a linear interpolation.

Figure 8:
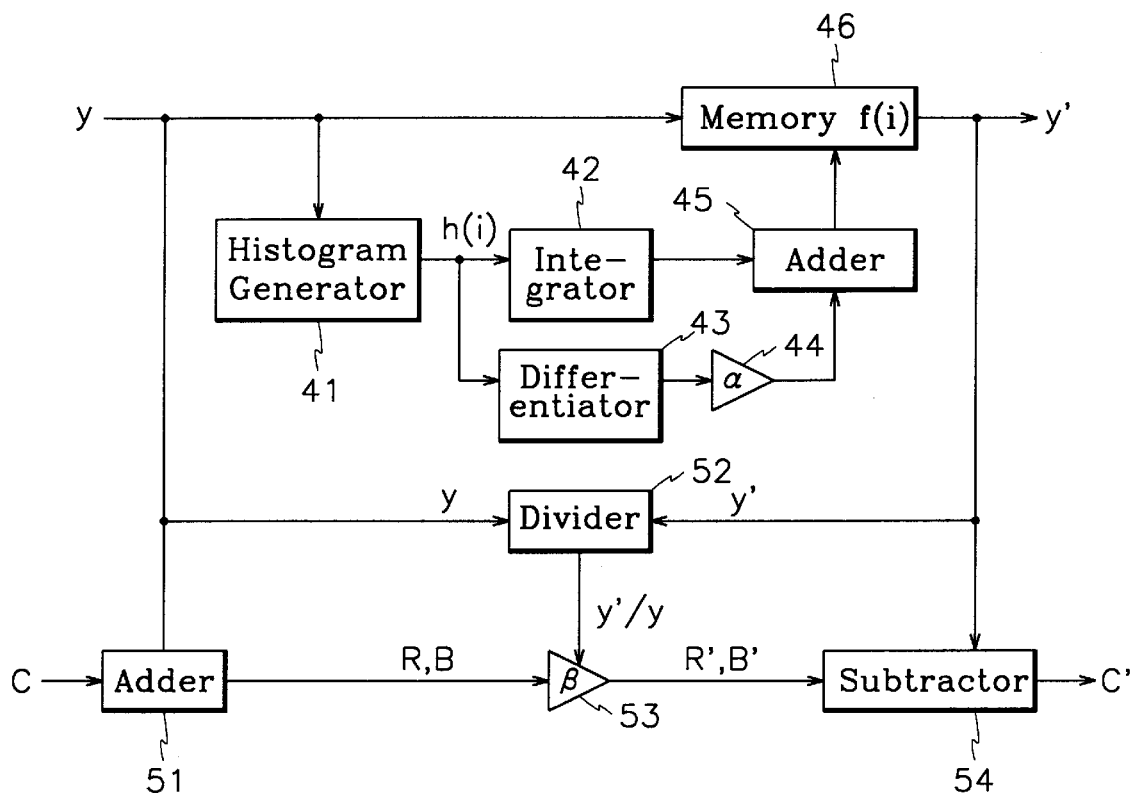
FIG. 8 is a block diagram showing the dynamic range expanding apparatus according to a second embodiment of the invention.
Figure 9:
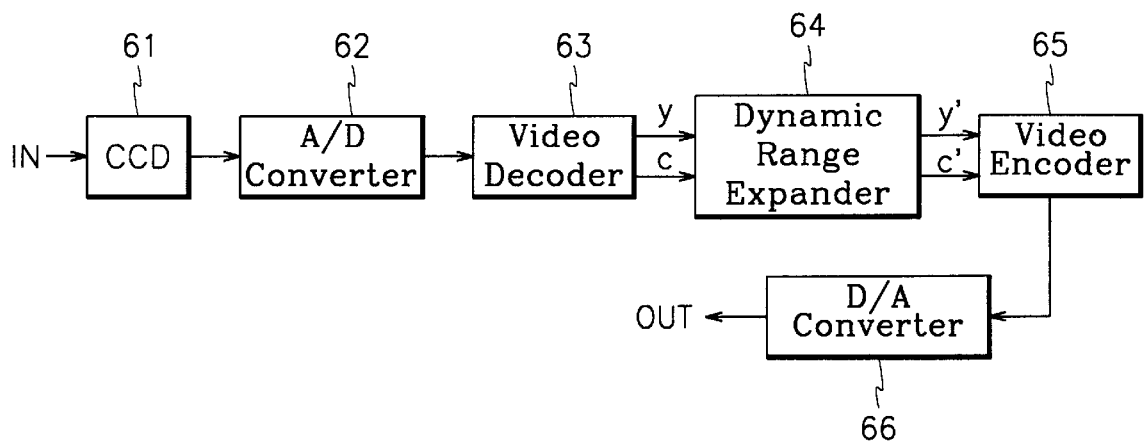
FIG. 9 is a block diagram showing the camera system having the dynamic range expanding apparatus of FIG. 8.

Next, the second embodiment will be considered with reference to FIGS. 8 and 9.

The dynamic range expanding apparatus constructed according to the second embodiment is operable to expand the dynamic range of color information as well as the brightness signal. Such a function is required in realizing the expansion of the dynamic range in the camera system.

In this case, since the direct control of the color difference signal results in a loss of balance in a color tone, the second embodiment of this invention controls the color difference signal indirectly through the transformed brightness signal y'.

More specifically, in the second embodiment, color signals B and R (of an RGB signal) are recombined from a brightness signal y and a color difference signal c. The color signals B and R are transformed by a ratio y'/y between the brightness signal y and the transformed brightness signal y' and thus a transformed color difference signal c' is obtained through the subtraction of the transformed color signals R' and B' from the transformed brightness signal y'.

The brightness signal y and the color difference signal c is represented in the following formula. The color difference signal c is comprised of Cr and Cb.

$$y=0.3R+0.6G+0.1B$$

$$Cr=R-y$$

$$Cb=B-y$$

When it is assumed that y'=f(y), each component of the color signals RGB should be transformed by the same ratio as the brightness transform ratio y'/y at the present coordinates for the valance of the color tone not to be lost. To obtain the color signals R and B, the brightness signal y is added to each color signals Cr and Cb, and the color signals R and B are transformed by the brightness transform ratio y'/y. The following formulas show these step.

$$R'=\beta X(Cr+y)$$

$$B'=\beta X(Cb+y),$$

herein the β is represented as β=y'/y.

In these circumstances, a transformed color difference signals Cr' and Cb' are respectively obtained through each subtraction of the transformed color signals R' and B' from the transformed brightness signal y'. In this case, another transformed color signal G' can be obtained through the recombination of the transformed brightness signal y' and the transformed color signals R' and B' in the next stage, such as a video encoder.

Next, the dynamic range expanding apparatus according to the second embodiment will be further described with reference to FIG. 8.

As shown in FIG. 8, the dynamic range expanding apparatus of this embodiment includes a histogram generator 41, an integrator 42, a differentiator 43, gain controllers 44 and 53, adders 45 and 51, a memory 46, a divider 52 and a subtractor 54.

In FIG. 8, the elements which are substantially the same as those in FIG. 6 have been indicated by the same reference numbers. Accordingly, no further description of the elements which are the same as those in FIG. 6 will be provided.

In view of the above, the connection relationship of the dynamic range expanding apparatus will be considered in the following.

A brightness signal y is input to the adder 51 together with the color difference signal c. Also, the brightness signal y and a transformed brightness signal y' produced from the memory 46 are input to the divider 52. The outputs R and B of the adder 51 and the output y'/y of the divider 52 are all input to the gain controller 53, and the outputs R' and B' of the gain controller 53 are input to the subtractor 54. From the subtractor 54, a transformed color difference signal c* is produced.

The color difference signal c is comprised of two components, such as Cr and Cb. In the adder 51, each component of the color difference signal c is added to the brightness signal y, and thus the color signals R and B are obtained. The divider 52 performs a dividing operation of the transformed brightness signal y' by the brightness signal y so as to produce a brightness transform ratio y'/y. The brightness transform ratio y'/y is input to the gain controller 53.

The gain controller 53 performs multiplying operations of the brightness transform ratio y'/y and each color signal from the adder 51. As a result of the multiplying operation, transformed color signals R' and B' are obtained from the gain controller 53. The subtractor 54 performs subtracting operations of the transformed brightness signal y' from each transformed color signals R' and B', so that the transformed color difference signal c' is obtained.

In FIG. 9, a camera system having the dynamic range expanding apparatus according to the second embodiment is illustrated.

As shown in FIG. 9, the camera system includes a CCD (charge coupled device) 61, an analog-to-digital converter 62, a video decoder 63, a dynamic range expander 64, a video encoder 65 and a digital-to-analog converter 66.

In the above configuration, the dynamic range expander 64 is substantially the same as that of the second embodiment.

Firstly, the input rays reflected by the objects are input to the CCD 61 via a lens unit (not shown in FIG. 9). The CCD 61 converts the input rays into the electrical signal, and thus an analog video signal is obtained. The analog video signal is input to the analog-to-digital converter 62 and transformed into the digital video signal by the converter 62.

The video decoder 63 receives the digital video signal and transforms it into a brightness signal y and a color difference signal c. The brightness signal y and the color difference signal are input to the dynamic range expander 64, and the dynamic range expander 64 respectively transforms the signals y and c into the signals y' and c', each having an expanded dynamic range, as described in the above embodiment. The video encoder 65 receives the transformed brightness signal y' and the transformed color difference signal c', and transforms each signal into a video format suitable for storing or display. The output of the encoder 65 is converted to an analog video signal by the D/A converter 66, and the output of the D/A converter 66 is provided for other peripheral equipment.

As a result the dynamic range expanding apparatus of this invention combines the integral operation and the differential operation with respect to the brightness distribution function, to determine a brightness transform function, to make it possible to attain an expansion of the dynamic range in the video signal while suppressing the quantization noise.

Moreover, the dynamic range expanding apparatus of this invention can transform the color difference signal by using the brightness transform ratio without losing the valance in a color tone. Accordingly, the apparatus constructed according to the present invention need not trade-off between the dynamic range and the quantization noise as with prior art systems, and can realize a wide dynamic range for video images.

As described above, the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. A dynamic range expanding apparatus of a video image, comprising:

brightness distribution generating means for receiving a brightness signal of a video image and outputting a brightness distribution function corresponding to the brightness signal;

an integrator coupled to the brightness distribution generating means for receiving the brightness distribution function and outputting an integration of the brightness distribution function;

differentiating means coupled to the brightness distribution generating means for receiving the brightness distribution function and outputting a differential of the brightness distribution function multiplied by a predetermined gain;

a first adder for combining the output of the integrator and the output of the differentiating means; and a memory, which stores a plurality of brightness transform functions as look-up tables, for determining one look-up table in accordance with the output of the adder and outputting a transformed brightness signal through the determined look-up table in response to the brightness signal of the video image.

2. The dynamic range expanding apparatus according to claim 1, wherein the output of the differentiating means is the same as the result of a second-order differential operation as to the output of the integrator.

3. The dynamic range expanding apparatus according to claim 1, wherein the memory stores the brightness transform function corresponding to every few dynamic levels.

4. The dynamic range expanding apparatus according to claim 1, wherein the differentiating means includes, a differentiator for performing a differential operation of the brightness distribution function; and a first gain controller for multiplying the output of the differentiator by the predetermined gain.

5. The dynamic range expanding apparatus according to claim 4, wherein the predetermined gain is set to between about 0.7 to 1.5.

6. The dynamic range expanding apparatus according to claim 1, further comprising:

a second adder for producing a color signal in response to the brightness signal and a color difference signal;

a divider for performing a dividing operation of the transformed brightness signal received from the memory and the brightness signal, thereby producing a brightness transform ratio;

a second gain controller coupled to the divider and second adder for performing a multiplying operation of the color signal from the second adder by the brightness transform ratio from the divider, and thereby outputting a transformed color signal; and a subtractor for performing a subtracting operation of the transformed brightness signal from the transformed color signal, and thereby producing a transformed color difference signal.

7. The dynamic range expanding apparatus according to claim 6, wherein the output of the differentiating means is the same as the result of a second-order differential operation as to the output of the integrator.

8. The dynamic range expanding apparatus according to claim 6, wherein the memory stores the brightness transform function corresponding to every few dynamic levels.

9. The dynamic range expanding apparatus according to claim 6, wherein the differentiating means includes, a differentiator for performing a differential operation of the brightness distribution function; and a gain controller for multiplying the output of the differentiator by the predetermined gain.

10. The dynamic range expanding apparatus according to claim 9, wherein the predetermined gain is set to between about 0.7 to 1.5.

11. A wide dynamic range camera system, comprising:

a video decoder for transforming a digital video signal into a brightness signal and a color difference signal;

a dynamic range expander including, a brightness distribution generating means for receiving the brightness signal of a video image and producing a brightness distribution function corresponding to the brightness signal;

an integrator for performing an integral operation of the brightness distribution function;

a differentiating means for performing a differential operation of the brightness distribution function and producing the result of the differential operation multiplied by a predetermined gain;

a first adder for combining the output of the integrator and the output of the differentiating means;

a memory, which stores a plurality of brightness transform functions as look-up tables, for determining one look-up table in accordance with the output of the adder and outputting a transformed brightness signal through the determined look-up table in response to the brightness signal;

a second adder for producing a color signal by adding the brightness signal and the color difference signal;

a divider for performing a dividing operation of the transformed brightness signal from the memory by the brightness signal, thereby producing a brightness transform ratio;

a second gain controller for performing a multiplying operation of the color signal from the second adder by the brightness transform ratio from the divider, and thereby producing a transformed color signal; and a subtractor for performing a subtracting operation of the transformed brightness signal from the transformed color signal, and thereby producing a transformed color difference signal; and, a video encoder for receiving the transformed brightness signal and the transformed color difference signal and transforming each signal into a video format suitable for storing or display.

12. The wide dynamic range camera system according to claim 11, further comprising, a charge coupled device for transforming optical rays reflected by objects into an electrical signal; and an analog-to-digital converter for transforming the output of the charge coupled device into a digital signal, and thereby producing the digital video signal.

* * * * *